No. 660,194. Patented Oct. 23, 1900.
C. D. LUKENS.
TOOTH STRAIGHTENING APPLIANCE.
(Application filed July 3, 1900.)
(No Model.)

Witnesses
Fred. W. Dyunckel.
H. T. Gavrilov

Inventor
C. D. Lukens,
By Cann & Cann,
Attorneys.

UNITED STATES PATENT OFFICE.

CLARENCE D. LUKENS, OF ST. LOUIS, MISSOURI.

TOOTH-STRAIGHTENING APPLIANCE.

SPECIFICATION forming part of Letters Patent No. 660,194, dated October 23, 1900.

Application filed July 3, 1900. Serial No. 22,407. (No model.)

*To all whom it may concern:*

Be it known that I, CLARENCE D. LUKENS, a citizen of the United States, and a resident of the city of St. Louis, in the State of Missouri, have invented a new and useful Improvement in Tooth-Straightening Appliances, of which the following is a specification.

My invention relates to dental appliances; and has for its principal object to provide a device for moving and straightening teeth.

It consists principally in making the device which serves for clamping a band upon one tooth serve also as a mounting for a bar or rod designed to exert force upon another tooth.

It also consists in making the clamping bolt of one tooth-band hollow to permit a draw-bar to extend therethrough.

It also consists in combinations and arrangements of parts and in the details of construction hereinafter described and claimed.

Figure 1:
Figure 2:
Figure 3:
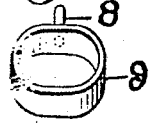
Figure 4:
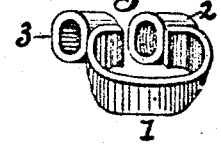
Figure 5:
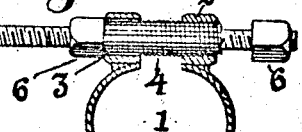
Figure 7:
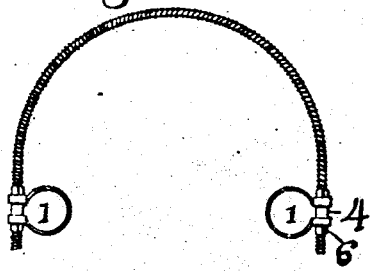
Figure 6:
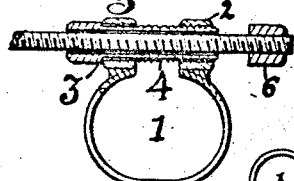
Figure 8:
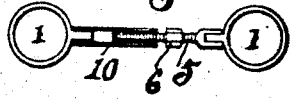

In the accompanying drawings, which form part of this specification, and wherein like symbols refer to like parts wherever they occur, Figure 1 is a view of my device. Fig. 2 is a view of the draw-bar with the socket end shown in section. Fig. 3 is a view of the studded tooth-band designed for mounting on the tooth to be straightened. Fig. 4 is a view of the clamping-band. Fig. 5 is a sectional view of the clamping-band with the bolt and draw-bar assembled. Fig. 6 is a sectional view of the clamping-band and clamping-bolt, showing the draw-bar in position. Fig. 7 is a view illustrating the method of using an arch with my device. Fig. 8 is a modification.

My device comprises a band of sheet metal 1, having at each end a tubular sleeve 2 3, arranged to be in alinement when the band is clamped. One of these sleeves 2 is screw-threaded to coöperate with a tubular threaded bolt 4. This threaded bolt 4 extends through the opposite sleeve 3, and its head bears against the end of said sleeve 3. This bolt thus serves to clamp said band firmly in the tooth.

A threaded draw-bar 5 extends through the tubular clamping-bolt and has a threaded nut 6 working thereon, which nut abuts against the end of the tubular bolt 4. The opposite end of said draw-bar has a lateral projection 7, provided with a socket, which socket is of such size as to fit over a stud 8, mounted on a tooth-band 9, adapted to be fitted around the tooth undergoing operation.

The operation of the foregoing construction is as follows: The clamping-band is first mounted on one of the molar teeth and firmly clamped thereon by means of the hollow bolt. The studded band is firmly cemented or otherwise suitably mounted on the tooth to be straightened, and then the draw-bar is inserted through the hollow bolt and its socket fitted over the stud on said band. Then the nut is turned on said draw-bar, whereby the tooth to be straightened is pulled with a force depending upon the position of the nut on the threaded draw-bar.

The most important advantages of my construction are that it avoids the use of projecting parts liable to cause irritation of the tongue. It makes the clamping-bolt serve the function of an abutment for the working nut, and thereby avoids the necessity for mounting a separate piece upon the clamping-band, and by using a stud upon the tooth-band I secure a larger and firmer soldering-surface than could otherwise be easily secured, and the two sleeves being mounted on the ends of the band afford great facility for alinement, so as to give the proper direction to the draw-bar.

Fig. 8 illustrates a modification of my device wherein the threaded bar is used as a jack-screw. In this construction the tubular socket-piece is mounted on the end of the screw and in alinement therewith instead of projecting laterally therefrom. In use studded bands are cemented or otherwise suitably mounted on the tooth to be moved and on another tooth which serves as an abutment for the jack-screw. The screw is first inserted in the tube 10, and then the end of the tube is fitted over the stud of one band and the socket-piece is fitted over the stud of the other band. The nut is then turned to bear against the end of the tube, and thereby apply force to the tooth. The most important advantages of this construction are its simplicity and the fact that the parts will remain properly assembled even if the tooth should cease to resist the force applied.

It is obvious that the nut might be mounted on the draw-bar between the two teeth instead of at the end of the draw-bar farthest from the tooth to be straightened. In this case the force exerted by the bar becomes a push instead of a pull, as above described. It is also obvious that clamping-bands might be mounted upon molar teeth on opposite sides of the jaw, in which case the threaded bar may be made of arch form to coöperate with both the said clamping-bands. In this case the force may be applied for straightening the tooth by means of devices adjusted along said arch-bar, as shown in Fig. 7.

My device admits of various other modifications, and I do not desire to be limited to the construction shown.

What I claim is—

1. A tooth-straightening appliance comprising a band adapted to encircle a tooth and having tubular sleeves mounted on its ends, and one of said sleeves being screw-threaded, and a tubular bolt threaded to coöperate with said threaded sleeve, and attached means for operating on another tooth substantially as described.

2. A tooth-straightening appliance comprising a band to encircle a tooth, a tubular bolt adapted to clamp the ends of said band, a threaded bar extending through said bolt and having a nut working thereon to abut against the end of said bolt, and means for operatively connecting said bar to another tooth, substantially as described.

3. A tooth-straightening appliance comprising a band adapted to encircle a tooth, a hollow bolt adapted to clamp the ends of said band, a threaded draw-bar extending through said bolt and having a nut working thereon, a second band adapted to encircle the tooth undergoing operation and provided with a stud thereon, the end of said draw-bar having a lateral projection provided with a socket adapted to fit over said stud, substantially as described.

4. A tooth-straightening appliance comprising a tubular member and a screw adapted to be inserted therein, and a nut working on said screw, said screw having a socket-piece at its end adapted to fit over a stud on the tooth-band, substantially as described.

5. A tooth-straightening appliance comprising a tubular member, a screw adapted to be inserted therein, and a socket-piece at the end of said screw and adapted to fit over a stud on a tooth-band, substantially as described.

CLARENCE D. LUKENS.

Witnesses:
JAMES A. CANE,
MARY E. MEAD.